Aug. 5, 1952     J. E. FELDMAN     2,605,504
FLAT MOLD FOR BATHING CAPS
Filed Sept. 3, 1948     2 SHEETS—SHEET 1
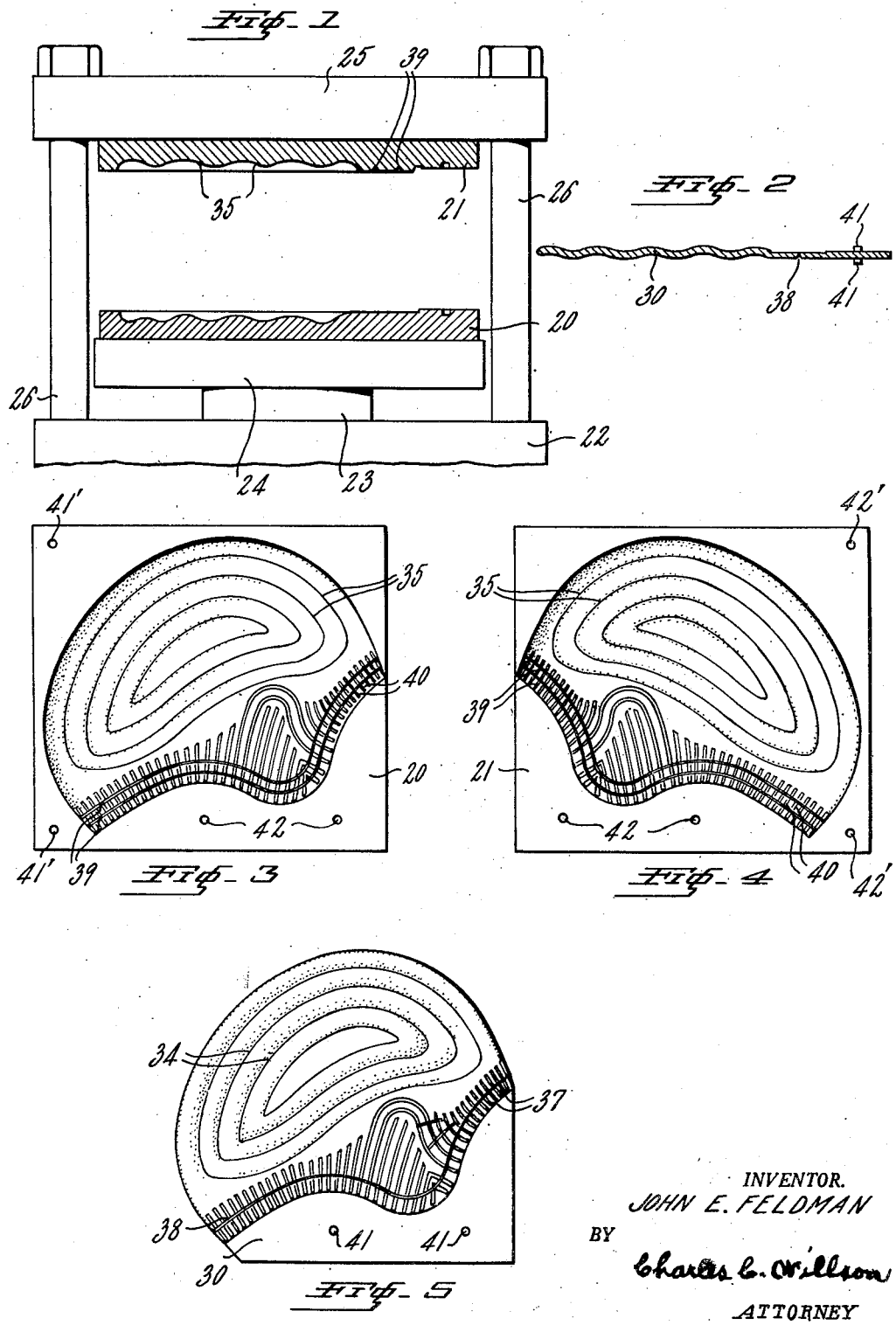
INVENTOR.
JOHN E. FELDMAN
BY Charles E. Willson
ATTORNEY Aug. 5, 1952  J. E. FELDMAN  2,605,504
FLAT MOLD FOR BATHING CAPS
Filed Sept. 3, 1948  2 SHEETS—SHEET 2
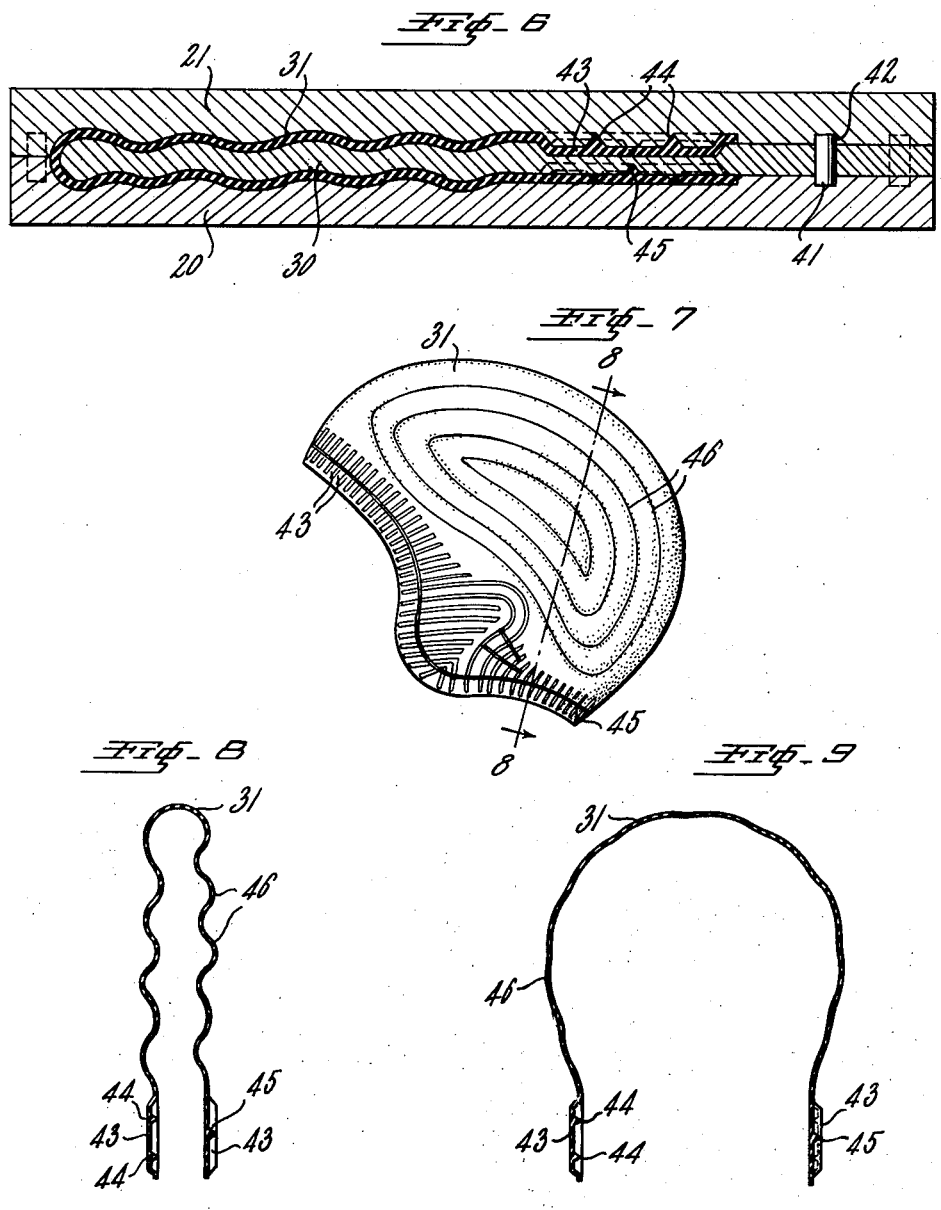
INVENTOR.
JOHN E. FELDMAN
BY
Charles C. Willson
ATTORNEY Patented Aug. 5, 1952

2,605,504

UNITED STATES PATENT OFFICE 2,605,504

FLAT MOLD FOR BATHING CAPS

John E. Feldman, Garfield, N. J., assignor to United States Rubber Company, New York, N. Y., a corporation of New Jersey Application September 3, 1948, Serial No. 47,580

1 Claim. (Cl. 18—35)

This invention relates to an improved mold for bathing caps and similar shaped articles, and more particularly to such a mold having a relatively flat core and cooperating mold plates that will shape a bathing cap accurately to the shape of the head.

Conventional press molds for making bathing caps having the desired head-shape are expensive to make and difficult to use by reason of their large size. Such molds usually consist of a head-shaped, substantially spherical core having the size and shape of the finished cap, and an outer mold section made in two parts and having a correspondingly shaped cavity, so that the outer mold will fit over the core to confine and shape the cap under vulcanizing pressures. This type of mold construction places severe limitations on the design of the cap, and is impractical for use in forming caps having pronounced protuberances or depressions in relief, such as are required in certain highly desirable types of bathing caps having a waterproof sealing band around the edge. It is evident that such protuberances or depressions prevent the outer mold members from being fitted over the core.

The principal object of the present invention is to provide a substantially flat mold for making bathing caps which will conform to the head without stretching appreciably.

Another object of this invention is to provide a bathing cap mold which can be used to mold caps having pronounced protuberances or depressions.

These and other objects which will be evident from the following detailed description, are accomplished by means of a three-element mold comprising a relatively thin core having a plurality of deep convolutions on each of its faces, and two outer mold plates having faces correspondingly convoluted to define a convoluted mold cavity between the core and the mold plates when the core and mold plates are placed together. This cavity has the form of a substantially flat bathing cap, and the convolutions are such that the convoluted area of the cap readily expands, when the cap is placed on the head of the wearer, to the size and shape of the head without appreciably stretching the material of the cap. In this way a cap which is, in effect, head-shaped can be molded in a mold of only slightly greater thickness than is required for molding a flat bathing cap. This mold construction permits the formation of virtually any desired design of waterproof sealing band along the edge of the cap.

The invention will be further understood from the following detailed description when read in conjunction with the accompanying drawings, wherein:

Fig. 1 is a side elevation of a mold press equipped with substantially flat outer mold plates, shown in section, that have convoluted molding surfaces;

Fig. 2 is a cross-section of a flat core piece which has convoluted surfaces and fits in between the outer mold plates of Fig. 1;

Fig. 3 is a plan view of the lower mold plate viewed from above;

Fig. 4 is a plan view of the upper mold plate viewed from below;

Fig. 5 is a plan view of the core viewed from above;

Fig. 6 is a cross-section of the assembled mold containing a bathing cap;

Fig. 7 is a side view of the molded bathing cap turned right side out;

Fig. 8 is a section of the cap taken on the line 8—8 of Fig. 7, and

Fig. 9 is a similar view, showing the cap expanded to head size and shape.

Referring to Fig. 1 of the drawing, the lower mold plate 20 and the upper mold plate 21 are shown attached to a conventional rubber molding press. The base of the press 22, encloses a conventional hydraulic mechanism (not shown) for raising the piston 23 and the lower platen 24 that supports the plate 20. The upper platen 25, to which the plate 21 is secured, is suitably supported on standards 26.

The convoluted core piece 30 shown in Fig. 2 fits in between the mold plates 20 and 21 and in cooperation therewith defines a convoluted cavity when assembled as in Fig. 6, wherein the assembled mold is shown with a bathing cap therein and turned inside out. The convoluted cavity corresponds to the head enclosing portion 31 of the cap. The convolutions on opposite faces of the core piece 30 are in what might be termed parallel relation, that is, the convoluted surfaces on each face are substantially equi-distant from each other over most of the convoluted area. In other words, the thickness of the core is substantially constant over most of the convoluted area. This structure results in a core of minimum thickness and in an assembled mold of minimum thickness.

Referring to the plan views of the mold parts, Figs. 3, 4 and 5, the flat core 30 is seen to have convolutions 34 on its opposite faces corresponding to the head-enclosing portion of the cap. The outer plates 20 and 21 also have corresponding convolutions 35 which define the convoluted cavity when the mold plates and core are placed together as in Fig. 6. These convolutions 34 and 35 have the form of looped or curved troughs disposed one loop inside another, so that they serve to stretch the side walls of the cap longitudinally and transversely and hold the walls so stretched while the cap is being vulcanized. The purpose of these convolutions is to increase the length of the rubber sheet in the sides of the cap from the crown to the edge of the cap, and these convolutions should be sufficiently pronounced to stretch the unvulcanized rubber from a length corresponding to a radius of a circle to a length corresponding to a ninety degree arc of such circle, and hold the rubber stretched until the cap is vulcanized.

The band along the edge of the cap may be plain, but preferably, as shown in the drawing, the band has impressed thereon a suitable water sealing structure to prevent water from entering under the edge of the cap. In the particularly effective sealing band structure shown, referring to Fig. 5, the core for producing this construction has impressed thereon ruffles 37 extending generally at right angles from the edge of the cap and a cut 38 running crosswise of the ruffles. Since the cap is intended to be formed inside out on the core, it will be evident that the cut 38 will result in a rib on the outside of the cap running crosswise of outwardly projecting ruffles when the cap is turned right side out.

The structure of the sealing band on the inside of the cap is evident on the outer plates 20 and 21 in Figs. 3 and 4 respectively. Each of the outer plates has a pair of cuts 39 running crosswise of the ruffles 40 and alternately disposed with respect to the cut 38 on the core.

The resulting ruffled and ribbed sealing band structure causes the edge of the cap to move inwardly against the skin of the wearer when the cap is placed on the head, thus maintaining the band in water sealing contact with the skin. This effect is explained in more detail in my copending application, Serial No. 39,663, filed July 20, 1948, now Patent No. 2,533,444, wherein a bathing cap having a ruffled and ribbed sealing band is claimed.

Suitable means are provided for proper registration of the core and outer plates when placed together, e. g., lugs 41 and 41' and corresponding recessions 42 and 42'.

A cap may be made with this mold by cutting out a calendered sheet of rubber or other elastic material of suitable thickness and placing the material over the faces of the mold. With the core piece in position, the platens 24 and 25 shown in Fig. 1 are brought together by hydraulic pressure in the conventional manner. Heat and pressure sufficient to mold and vulcanize the cap in the desired shape are applied.

The cap, as it appears after being removed from the mold and turned right side out, is shown in Figs. 7, 8 and 9. The outside ruffles 43 correspond to the ruffles 40 on the mold surface in Figs. 3 and 4. The inside ribs 44 correspond to the cuts 39, while the outside rib 45 corresponds to the cut 38 on the mold core. The convolutions 46 on the head-enclosing portion 31 of the cap correspond to the convolutions 34 and 35 on the mold surfaces shown in Figs. 3, 4, and 5.

Although the cap has essentially the form of a flat bathing cap as shown in Fig. 8, the convolutions permit the cap to be extended to head size and shape as shown in Fig. 9 without appreciable stretching of the material of the cap. Thus, the cap is in effect fully equivalent to and fits the head as comfortably as a head-shaped cap made on a large conventional head-shaped mold. It is apparent from Fig. 9 that the convolutions 46 are only slightly evident when the cap is extended to head size and shape.

Further, it should be noted that it would not be possible to fabricate the sealing band structure shown, or any sealing band structure having pronounced ribs or other protuberances or depressions formed in relief along the edge of the cap, in a conventional head-shaped mold, since the outer mold members would not be able to engage the core.

Thus, according to the invention, the head-enclosing portion of the cap, which constitutes, when expanded to head shape, a surface having no straight line elements and having essentially compound curve elements, i. e., elements which are curves of varying radii, is formed in a relatively flat mold. Such a flat mold is ideally suited to forming the sealing band portion of the cap.

The specific embodiment of the invention which has been described in detail may be modified in various particulars. Thus, the convolutions may vary in number and may be disposed differently on the surface of the cap if desired. Other sealing band constructions may be employed, or the edge of the cap may be made simply plain.

It will be evident to those skilled in the art of molding that this type of mold may also be used for injection molding of bathing caps, by providing suitable gates or entrances into the mold cavity through which plastic material may be injected.

Having thus described my invention, what I claim and desire to protect by Letters Patent is:

A flat mold for bathing caps, comprising two flat mold plates and a relatively thin core piece, each of said mold plates having a die cavity formed in the face thereof, the bottom of each of said cavities being formed with a plurality of deep convolutions in the form of closed loops encircling one another, whereby when said molding plates are placed together in molding position the individual die cavities form a single bathing cap cavity, said thin core piece having a single extension thereon adapted to be clamped between the mold plates so as to suspend the same within but spaced from the molding surfaces of said single bathing cap cavity, said extension having a width equal to the opening in the unstretched cap, whereby the cap surrounds the core, said core piece being formed with convolutions in the flat faces thereof, similar but of reverse contour to those in the mold plates whereby a flattened bathing cap may be molded having corrugations in the sidewalls thereof corresponding to the convolutions of the mold to provide sufficient material in the sidewalls thereof to allow the cap to be easily expanded to fit the head of the wearer without stretching appreciably the sidewalls of the cap.

JOHN E. FELDMAN.

REFERENCES CITED

The following references are of record in the file of this patent:

UNITED STATES PATENTS

| Number | Name | Date |
| --- | --- | --- |
| 1,195,412 | Stimson | Aug. 22, 1916 |
| 1,324,850 | Roberts | Dec. 16, 1919 |
| 1,642,755 | Ward | Sept. 20, 1927 |
| 1,892,085 | Stein | Dec. 27, 1932 |
| 2,078,913 | Strickhouser et al. | Apr. 27, 1937 |
| 2,119,495 | Spanel | May 31, 1938 |
| 2,238,833 | Tillotson | Apr. 15, 1941 |
| 2,323,014 | De Laney | June 29, 1943 |
| 2,357,360 | Rollmann | Sept. 5, 1944 |